US012769757B2

(12) United States Patent
Kruempelmann et al.

(10) Patent No.: US 12,769,757 B2
(45) Date of Patent: Oct. 20, 2026

(54) PRE-DEPLOYMENT OF CONFIGURATION SETTINGS USING SHARED CONTAINER TECHNOLOGY

(71) Applicant: SAP SE, Walldorf (DE)

(72) Inventors: Wulf Kruempelmann, Altlussheim (DE); Susanne Schott, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/088,510

(22) Filed: Mar. 24, 2025

(65) Prior Publication Data

US 2026/0288753 A1 Sep. 24, 2026

(51) Int. Cl.
*G06F 16/00* (2019.01)
*G06F 16/23* (2019.01)
*G06F 16/26* (2019.01)

(52) U.S. Cl.
CPC .............. *G06F 16/26* (2019.01); *G06F 16/23* (2019.01)

(58) Field of Classification Search
None
See application file for complete search history.

(56) References Cited

U.S. PATENT DOCUMENTS

2021/0342785 A1* 11/2021 Mann .................... G06F 16/258

FOREIGN PATENT DOCUMENTS

CN 119895836 A * 4/2025 ........... G06Q 30/018

* cited by examiner

*Primary Examiner* — Tuankhanh D Phan
(74) *Attorney, Agent, or Firm* — Mintz Levin Cohn Ferris Glovsky and Popeo, P.C.

(57) ABSTRACT

Arrangements for pre-deployment of configuration settings using shared container technology are provided. A customized table may be generated with the tenant identifier field being removed. A view of the database table which defines joins from the customized table including customer key ranges and a centralized table including vendor key ranges may be generated. Instead-of triggers used to modify the view upon an insert, upsert, or update operation on the view may be defined. An instead-of trigger may be executed in response to a modification action to the view. An instead-of trigger may determine whether the modification action applies to a customer key range or a vendor key range. The modification action may be redirected to the customized table in response to a determination that the modification action applies to the customer key range, or blocked in response to a determination that the modification action applies to the vendor key range.

17 Claims, 6 Drawing Sheets

PRE-DEPLOYMENT OF CONFIGURATION SETTINGS USING SHARED CONTAINER TECHNOLOGY

TECHNICAL FIELD

The subject matter described herein relates generally to data processing and more specifically to pre-deployment of configuration settings using shared container technology.

BACKGROUND

In multi-tenant enterprise resource planning (ERP) systems, tables may be prefilled by a software vendor in a separated key range. These configuration settings may make up a large percentage of a database load per tenant. Oftentimes, tables may contain identical or duplicative information. When there are several tenants, the amount of required data increases drastically. For example, organizations having hundreds or thousands of systems would duplicate this data per system.

SUMMARY

Methods, systems, and articles of manufacture, including computer program products, are provided for pre-deployment of configuration settings using shared container technology. In one aspect, there is provided a system including at least one processor and at least one memory. The at least one memory can store instructions that cause operations when executed by the at least one processor. The operations may include: generating a customized table based on a database table, the database table including a dataset including a tenant identifier field, key fields, and data fields, wherein generating the customized table removes the tenant identifier field; generating a view of the database table, wherein the view defines joins from the customized table and a centralized table, wherein the customized table includes customer key ranges and the centralized table includes vendor key ranges; defining one or more instead-of triggers used to modify the view upon an insert, upsert, or update operation on the view; executing the one or more instead-of triggers in response to a modification action to the view, wherein the one or more instead-of triggers determines whether the modification action applies to a customer key range or a vendor key range; redirecting the modification action to the customized table in response to a determination that the modification action applies to the customer key range, wherein a structured query language select function that identifies a criterion for record selection in the customer key range reads data from the customized table and writes data to the customized table; blocking the modification action in response to a determination that the modification action applies to the vendor key range; and automatically distributing updates to tenants In some variations, one or more of the features disclosed herein including the following features can optionally be included in any feasible combination. In some variations, the method may further include creating a pointer from the view to the customized table and the centralized table that causes a request to be redirected to one or more of the customized table or the centralized table. In some variations, a structured query language select function that identifies a criterion for record selection in the vendor key range reads data from the centralized table. In some variations, executing the one or more instead-of triggers includes inserting data in the dataset, via the view, by inserting new data to the customized table. In some variations, executing the one or more instead-of triggers includes updating data in the dataset, via the view, by replacing data in the customized table. In some variations, wherein executing the one or more instead-of triggers includes upserting data into the dataset, via the view, by replacing data in the customized table or inserting new data to the customized table based on a set of criteria. In some variations, the customer key range and the vendor key range includes different key ranges. In some variations, the key fields identify unique records in a data store. In some variations, the database table includes a relational database table.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
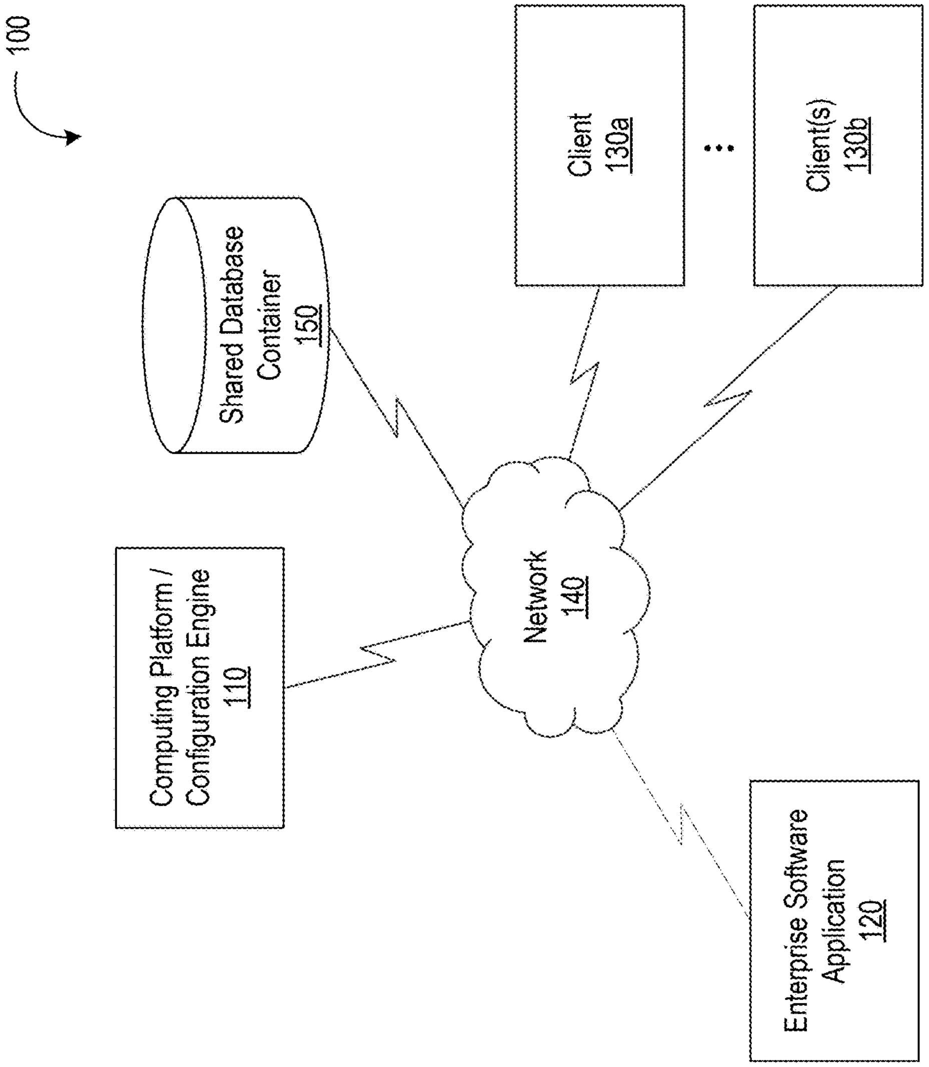
FIG. 1 depicts an illustrative computing environment for pre-deployment of configuration settings using shared container technology in accordance with some example embodiments.

When practical, like labels are used to refer to same or similar items in the drawings.

DETAILED DESCRIPTION

Aspects of the disclosure provide pre-deployment of configuration settings using shared container technology. More specifically, aspects of the disclosure create instead-of-triggers on application tables, redirecting the requests to other tables, for example, to distinguish between vendor-filled key ranges and customer data. Additional aspects of the disclosure reduces database space required for storing tables by at least a number of tenants for vendor delivered data via a sharing mechanism. For example, tables which are identical between customers may be stored only once via shared container technology rather than being stored per system. These and various other arrangements will be discussed more fully below.

FIG. 1 depicts a system diagram illustrating a computing environment 100, in accordance with some example embodiments. Referring to FIG. 1, the computing environment 100 may include a computing platform 110 (e.g., a multi-tenant computing system), an enterprise software application 120, and a shared database container 150. The enterprise software application 120 may be an enterprise resource planning (ERP) software application, a customer relationship management (CRM) software application, and/or the like. The computing environment 100 may further include a plurality of clients (e.g., tenants) including, for example, a first client 130*a*, a second client 130*b*, and/or the like. As shown in FIG. 1, the computing platform 110, the first client 130*a*, and the second client 130*b* may be communicatively coupled via a network 140. The network 140 may be a wired and/or wireless network including, for example, a wide area network (WAN), local area network (LAN), a virtual local area network (VLAN), the Internet, and/or the like. In some example embodiments, the computing platform 110 may maintain (e.g., store) configuration data (e.g., for an enterprise software application 120) in one or more database tables at a shared database container 150 coupled with the computing platform 110.

Figure 2:
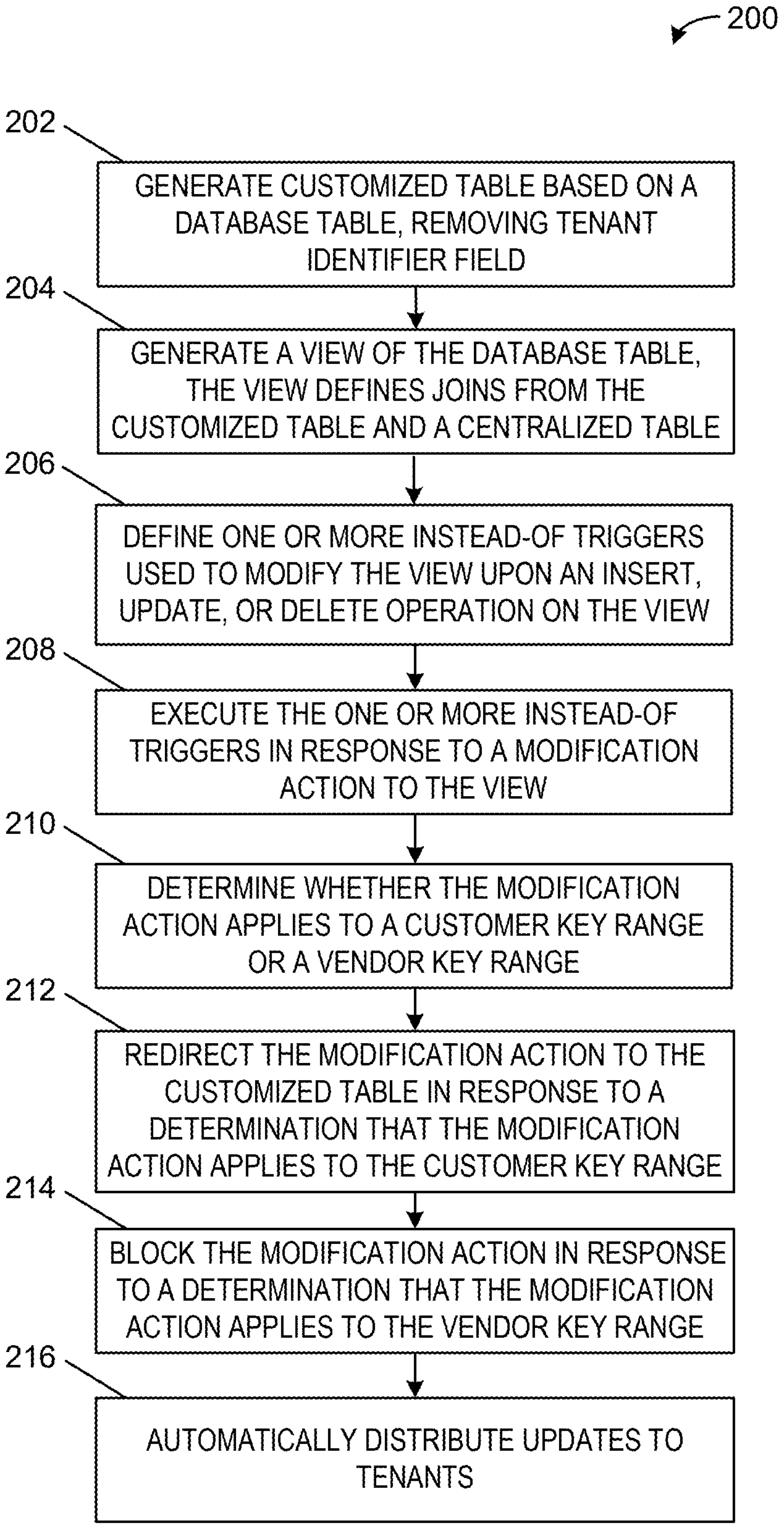
FIG. 2 depicts a flowchart illustrating a process for implementing pre-deployment of configuration settings using shared container technology, in accordance with some example embodiments.
Figure 3:
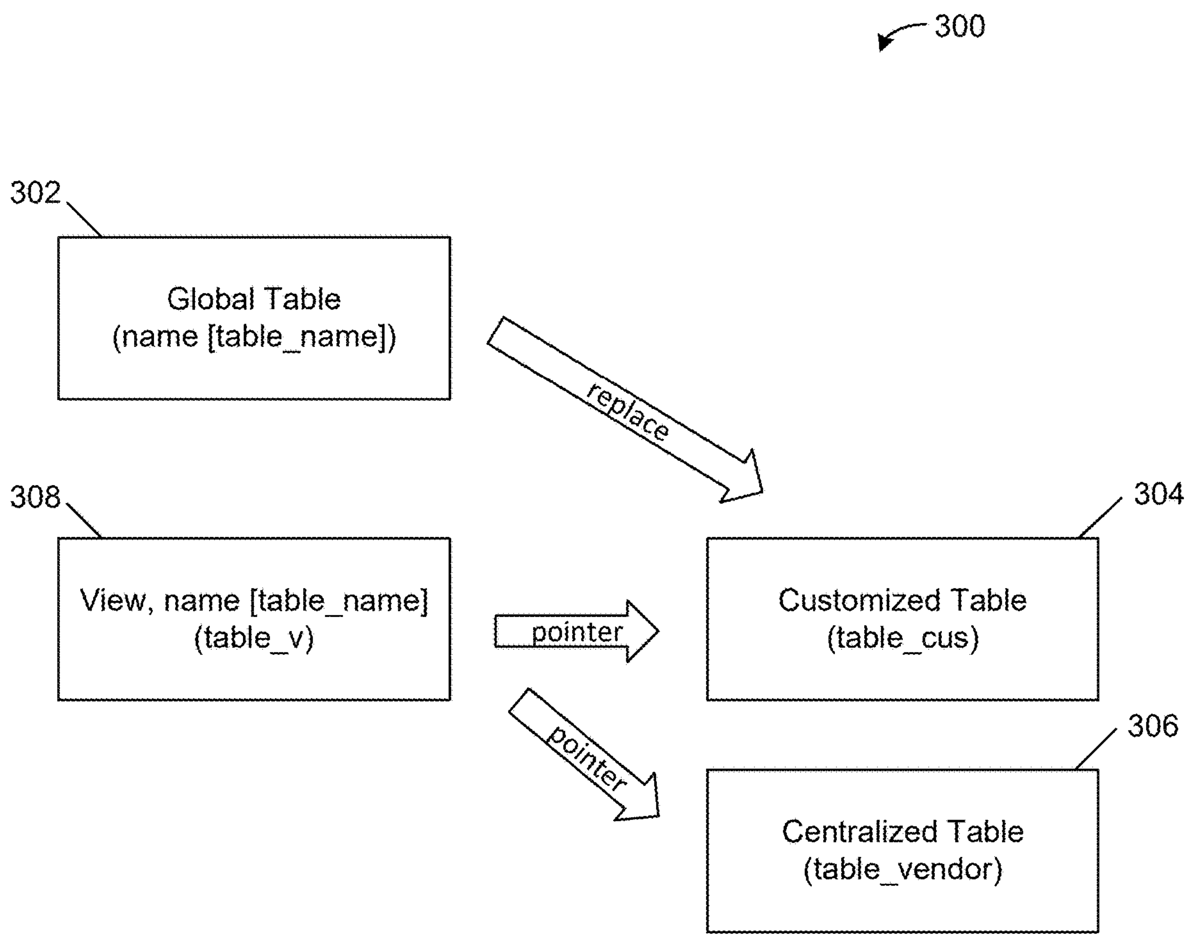
FIG. 3 depicts a block diagram illustrating a process for implementing pre-deployment of configuration settings using shared container technology, in accordance with some example embodiments.
Figure 4:
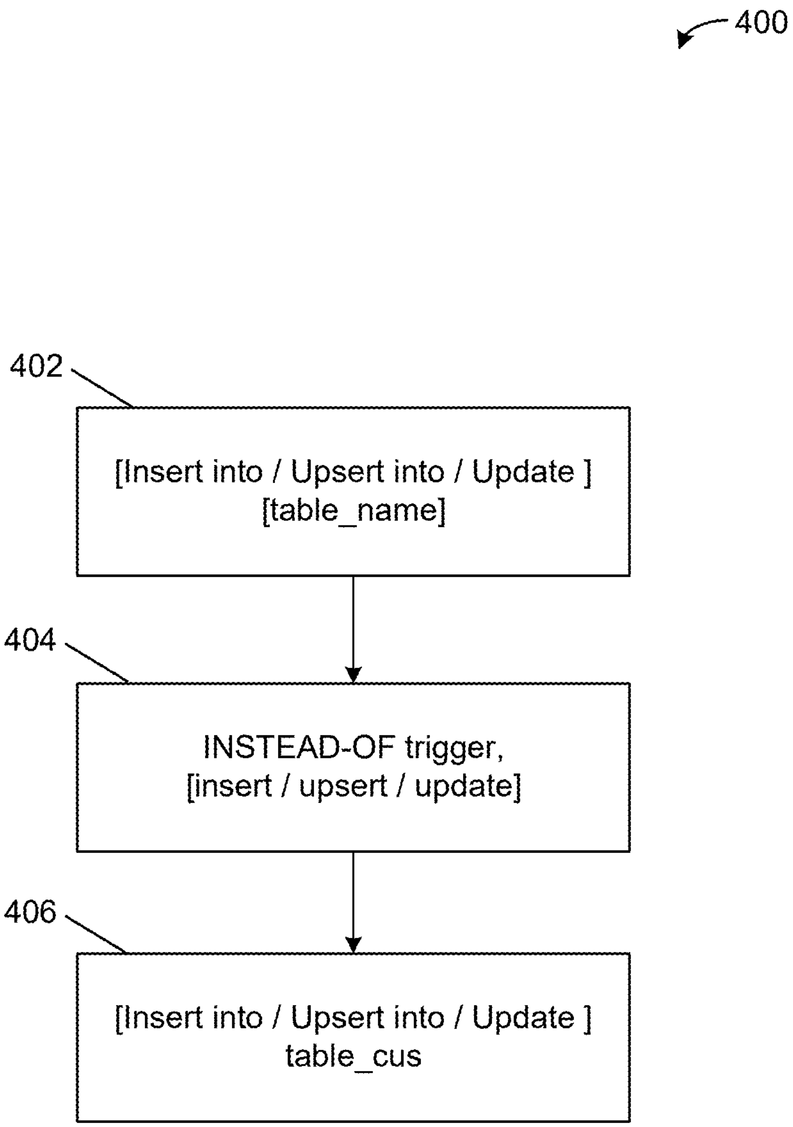
FIG. 4 depicts a flowchart illustrating a process for implementing a triggering component associated with pre-deployment of configuration settings using shared container technology, in accordance with some example embodiments.
Figure 5:
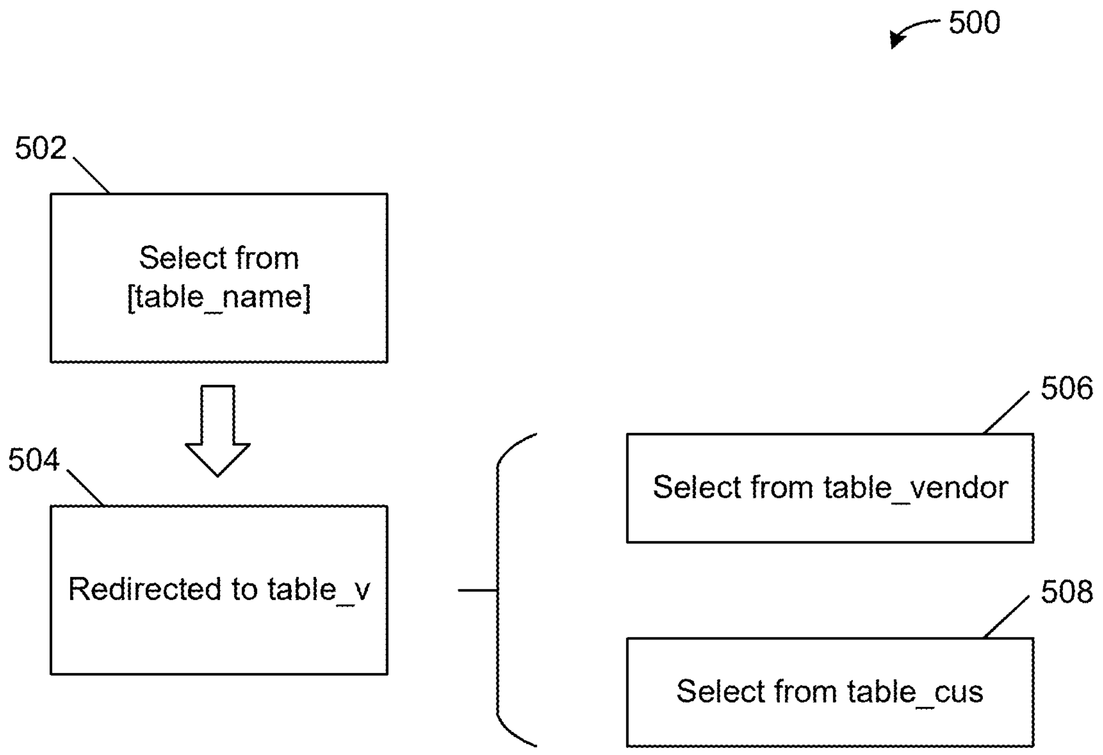
FIG. 5 depicts a flowchart illustrating a process for implementing an SQL SELECT query associated with pre-deployment of configuration settings using shared container technology, in accordance with some example embodiments.

FIG. 2 depicts a flowchart 200 illustrating a process for implementing pre-deployment of configuration settings using shared container technology, in accordance with some example embodiments. To further illustrate, FIGS. 3-5 depict example processes 300, 400, 500 for implementing pre-deployment of configuration settings using shared container technology, in accordance with some example embodiments. FIGS. 2-5 will be discussed together.

Referring to FIG. 2, at step 202, the computing platform 110 (e.g., via a configuration engine) may generate a customized table based on a database table (e.g., a table description). The database table (e.g., [table_name]) may include a dataset including a tenant identifier field (e.g., tenant_id), key fields (e.g., key_1, key_2, key_3, etc., identifying unique records in a data store), and data fields (e.g., data_1, data_2, data_3, etc.). The database table may be and/or include a relational database table.

In particular, as shown in FIG. 3, the computing platform 110 may replace the database table 302 (e.g., global table [table_name]) with another table 304 (e.g., rename/replace the table [table_name] to/with table [table_cus]). The customized table has the same structure, but removes the tenant identifier field. The global table may be an initial table that contains data in various systems that is identical to all customers.

At step 204, the computing platform 110 may generate a view (e.g., table_v) of the database table. As used herein, a "view" or "database view" may be a searchable object in the database (e.g., shared database container 150) that includes a result of a query on the database (e.g., shared database container 150). A "database view" does not store any data but may nevertheless operate akin to a "virtual table" in that the "database view" itself may be queried. The view is, for example, a relation defined in terms of stored database tables. For example, the view may define joins from the customized table (e.g., table_cus) and a centralized table (e.g., table_vendor). The customized table includes customer key ranges and the centralized table includes vendor key ranges.

As shown in FIG. 3, in some embodiments, the computing platform 110 may create a pointer from the view 308 (e.g., table_v) to the customized table 304 (e.g., table_cus) and the centralized table 306 (e.g., table_vendor) that causes a request to be redirected to one or more of the customized table 304 (e.g., table_cus) or the centralized table 306 (e.g., table_vendor). For example, a key range may refer to a predefined set of numbers or values used to identify or assign unique identifiers to business objects or data records. In some examples, the centralized table 306 (e.g., table_vendor) may be located on a central host device and the customized table 304 (e.g., table_cus) may be local on the system. Alternatively, the customized table 304 (e.g., table_cus) may also be located on a central host device.

As shown in FIG. 5, for example, a SELECT from [table_name] at 502 would proceed to the view at 504 (e.g., be redirected to table_v). Two actions are joined to the view. One is SELECT from table_vendor at 506 and the other is SELECT from table_cus at 508. For example, the SELECT from [table_name] at 502 is redirected to table_v at 504, and performs, via the view logic, SELECT from table_vendor at 506 and SELECT from table_cus at 508, puts both together, and returns it to the caller.

Returning to FIG. 2, at step 206, the computing platform 110 may define one or more instead-of triggers (e.g., "INSTEAD OF" SQL-trigger). An instead-of trigger includes a Structure Query Language (SQL) statement/trigger that is processed "instead of" an SQL update, upsert, or update statement. For example, the computing platform 110 may define an instead-of-insert trigger, an instead-of-upsert trigger, and an instead-of-update trigger. The instead-of trigger is defined on a view and allows a view to be inserted into, upserted into, or updated. After an instead-of trigger is added to a view, the view which previously could only be read from can be used as a target of an insert, upsert, or update operation. One or more triggering components may include one or more instead-of triggers used to insert/write to, upsert into, or update the database table upon an insert, upsert, or update operation, respectively, on the view. As discussed below, such instead-of-triggers redirect requests to other tables to distinguish between vendor filled key-ranges and customer data.

At step 208, the computing platform 110 may execute the one or more instead-of triggers in response to a modification action (e.g., a write attempt) to the view. At step 210, the one or more instead-of triggers may determine whether the modification action applies to a customer key range or a vendor key range. Since the customer key range and the vendor key range have different key ranges, there are no clashes.

In some examples, executing the one or more instead-of triggers may include inserting data in the dataset, via the view, by inserting (e.g., writing) new data to the customized table. In some examples, executing the one or more instead-of triggers may include updating data in the dataset, via the view, by replacing data in the customized table.

In some examples, executing the one or more instead-of triggers may include upserting data into the dataset (e.g., a combination of update and insert operations), via the view, by replacing data in the customized table or inserting new data to the customized table based on a set of criteria. For instance, an insert operation may check if a record with a given key or identifier exists in a table. If it does, the record is updated with the new values. If it does not, a new record is inserted with the provided data.

At step 212, in response to a determination that the modification action applies to the customer key range, the computing platform 110 may redirect the modification action to the customized table 304 (e.g., table_cus). In addition, a structured query language (SQL) SELECT function that identifies a criterion for record selection in the customer key range reads data from the customized table 304 (e.g., table_cus) and writes data to the customized table 304 (e.g., table_cus).

At step 214, in response to a determination that the modification action applies to the vendor key range, the computing platform 110 may block the modification action. The result is that any action in the vendor key range is selected from the database view 308 (e.g., table_v) and writes are blocked. In addition, an SQL SELECT function that identifies a criterion for record selection in the vendor key range reads data from the centralized table 306 (e.g., table_vendor).

In this way, the computing platform 110 translates a central update to an update action for a specific table. For example, as shown in FIG. 4, the computing platform may translate the upsert from the global table (e.g., [table_name]) at 402 to the upsert of the special tables (e.g., table_cus) at 404 through 406.

Advantageously, specialized tables are stored in a shared database so as to avoid identical data being stored in different systems. A view is created on the data in different systems, and an instead-of-trigger reads, writes, updates, and/or upserts data. Memory is preserved. In some aspects, this would enable writing only an insert or the deltas that would be customer-specific. At step 216, the computing platform 110 may automatically distribute updates to tenants.

Figure 6:
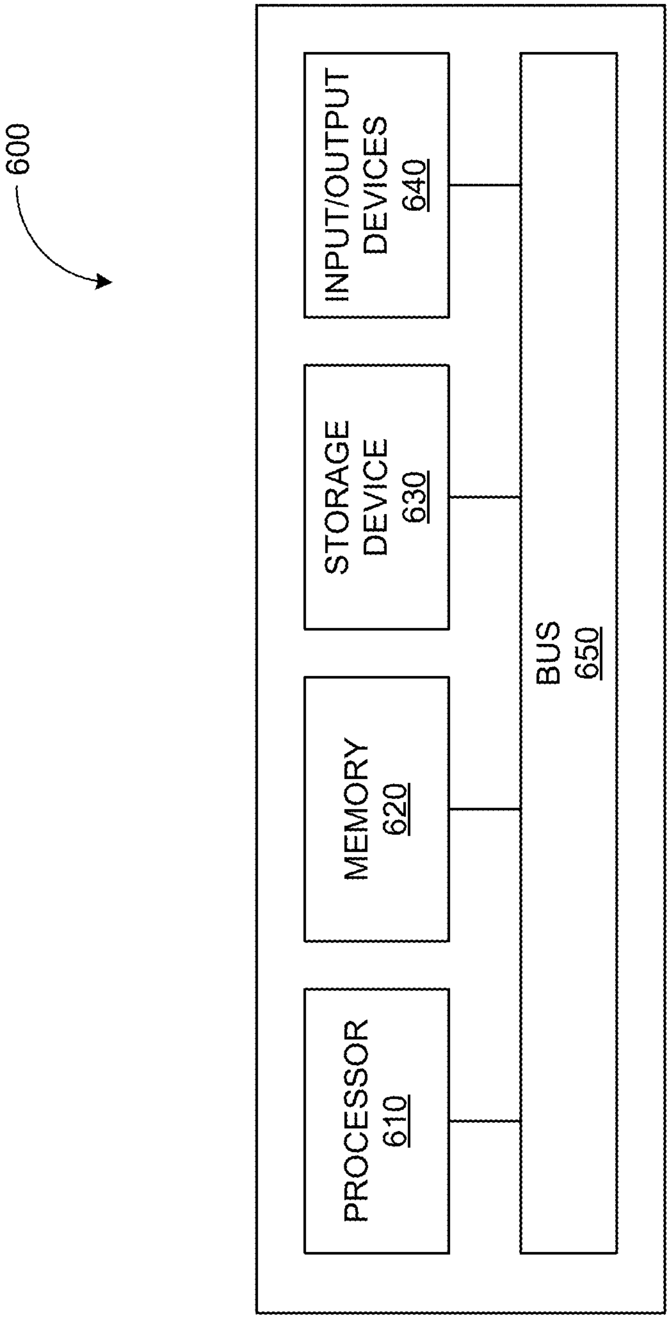
FIG. 6 depicts a block diagram illustrating a computing system, in accordance with some example embodiments.

FIG. 6 depicts a block diagram illustrating a computing system 600 consistent with implementations of the current subject matter. Referring to FIGS. 1-6, the computing system 600 can be used to implement the computing platform 110 and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the computing platform 110. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable storage medium such as volatile or non-volatile that stores information within the computing system 600. The memory 620 can store data structures representing configuration object databases, for example. The storage device 630 is capable of providing persistent storage for the computing system 600. The storage device 630 can be a solid-state device, a floppy disk device, a hard disk device, an optical disk device, a tape device, and/or any other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:

at least one data processor; and at least one memory storing instructions, which when executed by the at least one data processor, result in operations comprising:

generating a customized table based on a database table, the database table comprising a dataset including a tenant identifier field, key fields, and data fields, wherein generating the customized table removes the tenant identifier field;

generating a view of the database table, wherein the view defines joins from the customized table and a centralized table, wherein the customized table comprises customer key ranges and the centralized table comprises vendor key ranges;

defining one or more instead-of triggers used to modify the view upon an insert, upsert, or update operation on the view;

executing the one or more instead-of triggers in response to a modification action to the view, wherein the one or more instead-of triggers determines whether the modification action applies to a customer key range or a vendor key range;

redirecting the modification action to the customized table in response to a determination that the modification action applies to the customer key range, wherein a structured query language select function that identifies a criterion for record selection in the customer key range reads data from the customized table and writes data to the customized table;

blocking the modification action in response to a determination that the modification action applies to the vendor key range; and automatically distributing updates to tenants.

Example 2: The system of Example 1, further comprising: creating a pointer from the view to the customized table and the centralized table that causes a request to be redirected to one or more of the customized table or the centralized table.

Example 3: The system of any of Examples 1-2, wherein a structured query language select function that identifies a criterion for record selection in the vendor key range reads data from the centralized table.

Example 4: The system of any of Examples 1-3, wherein executing the one or more instead-of triggers comprises inserting data in the dataset, via the view, by inserting new data to the customized table.

Example 5: The system of any of Examples 1-4, wherein executing the one or more instead-of triggers comprises updating data in the dataset, via the view, by replacing data in the customized table.

Example 6: The system of any of Examples 1-5, wherein executing the one or more instead-of triggers comprises upserting data into the dataset, via the view, by replacing data in the customized table or inserting new data to the customized table based on a set of criteria.

Example 7: The system of any of Examples 1-6, wherein the customer key range and the vendor key range comprise different key ranges.

Example 8: The system of any of Examples 1-7, wherein the key fields identify unique records in a data store.

Example 9: The system of any of Examples 1-8, wherein the database table comprises a relational database table.

Example 10: A computer-implemented method, comprising:

generating a customized table based on a database table, the database table comprising a dataset including a tenant identifier field, key fields, and data fields, wherein generating the customized table removes the tenant identifier field;

generating a view of the database table, wherein the view defines joins from the customized table and a centralized table, wherein the customized table comprises customer key ranges and the centralized table comprises vendor key ranges;

defining one or more instead-of triggers used to modify the view upon an insert, upsert, or update operation on the view;

executing the one or more instead-of triggers in response to a modification action to the view, wherein the one or more instead-of triggers determines whether the modification action applies to a customer key range or a vendor key range;

redirecting the modification action to the customized table in response to a determination that the modification action applies to the customer key range, wherein a structured query language select function that identifies a criterion for record selection in the customer key range reads data from the customized table and writes data to the customized table;

blocking the modification action in response to a determination that the modification action applies to the vendor key range; and automatically distributing updates to tenants.

Example 11: The computer-implemented method of Example 10, further comprising: creating a pointer from the view to the customized table and the centralized table that causes a request to be redirected to one or more of the customized table or the centralized table.

Example 12: The computer-implemented method of any of Examples 10-11, wherein a structured query language select function that identifies a criterion for record selection in the vendor key range reads data from the centralized table.

Example 13: The computer-implemented method of any of Examples 10-12, wherein executing the one or more instead-of triggers comprises inserting data in the dataset, via the view, by inserting new data to the customized table.

Example 14: The computer-implemented method of any of Examples 10-13, wherein executing the one or more instead-of triggers comprises updating data in the dataset, via the view, by replacing data in the customized table.

Example 15: The computer-implemented method of any of Examples 10-14, wherein executing the one or more instead-of triggers comprises upserting data into the dataset, via the view, by replacing data in the customized table or inserting new data to the customized table based on a set of criteria.

Example 16: The computer-implemented method of any of Examples 10-15, wherein the customer key range and the vendor key range comprise different key ranges.

Example 17: The computer-implemented method of Examples 10-16, wherein the key fields identify unique records in a data store.

Example 18: The computer-implemented method of Examples 10-17, wherein the database table comprises a relational database table.

Example 19: A non-transitory computer readable storage medium storing instructions, which when executed by at least one data processor, result in operations comprising:

generating a customized table based on a database table, the database table comprising a dataset including a tenant identifier field, key fields, and data fields, wherein generating the customized table removes the tenant identifier field;

generating a view of the database table, wherein the view defines joins from the customized table and a centralized table, wherein the customized table comprises customer key ranges and the centralized table comprises vendor key ranges;

defining one or more instead-of triggers used to modify the view upon an insert, upsert, or update operation on the view;

executing the one or more instead-of triggers in response to a modification action to the view, wherein the one or more instead-of triggers determines whether the modification action applies to a customer key range or a vendor key range;

redirecting the modification action to the customized table in response to a determination that the modification action applies to the customer key range, wherein a structured query language select function that identifies a criterion for record selection in the customer key range reads data from the customized table and writes data to the customized table;

blocking the modification action in response to a determination that the modification action applies to the vendor key range; and automatically distributing updates to tenants.

Example 20: The non-transitory computer readable storage medium of Example 19, wherein the instructions, when executed by the at least one data processor, further result in operations comprising: creating a pointer from the view to the customized table and the centralized table that causes a request to be redirected to one or more of the customized table or the centralized table.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one data processor; and at least one memory storing instructions, which when executed by the at least one data processor, result in operations comprising:

generating a customized table based on a database table, the database table comprising a dataset including a tenant identifier field, key fields, and data fields, wherein generating the customized table removes the tenant identifier field;

generating a view of the database table, wherein the view defines joins from the customized table and a centralized table, wherein the customized table comprises customer key ranges and the centralized table comprises vendor key ranges;

creating a pointer from the view to the customized table and the centralized table that causes a request to be redirected to the customized table or the centralized table;

defining one or more instead-of triggers used to modify the view upon an insert, upsert, or update operation on the view;

executing the one or more instead-of triggers in response to a modification action to the view, wherein the one or more instead-of triggers determines whether the modification action applies to a customer key range or a vendor key range;

redirecting the modification action to the customized table in response to a determination that the modification action applies to the customer key range, wherein a structured query language select function that identifies a criterion for record selection in the customer key range reads data from the customized table and writes data to the customized table;

blocking the modification action in response to a determination that the modification action applies to the vendor key range; and automatically distributing updates to tenants.

2. The system of claim 1, wherein a structured query language select function that identifies a criterion for record selection in the vendor key range reads data from the centralized table.

3. The system of claim 1, wherein executing the one or more instead-of triggers comprises inserting data in the dataset, via the view, by inserting new data to the customized table.

4. The system of claim 1, wherein executing the one or more instead-of triggers comprises updating data in the dataset, via the view, by replacing data in the customized table.

5. The system of claim 1, wherein executing the one or more instead-of triggers comprises upserting data into the dataset, via the view, by replacing data in the customized table or inserting new data to the customized table based on a set of criteria.

6. The system of claim 1, wherein the customer key range and the vendor key range comprise different key ranges.

7. The system of claim 1, wherein the key fields identify unique records in a data store.

8. The system of claim 1, wherein the database table comprises a relational database table.

9. A computer-implemented method, comprising:

generating a customized table based on a database table, the database table comprising a dataset including a tenant identifier field, key fields, and data fields, wherein generating the customized table removes the tenant identifier field;

generating a view of the database table, wherein the view defines joins from the customized table and a centralized table, wherein the customized table comprises customer key ranges and the centralized table comprises vendor key ranges;

creating a pointer from the view to the customized table and the centralized table that causes a request to be redirected to the customized table or the centralized table;

defining one or more instead-of triggers used to modify the view upon an insert, upsert, or update operation on the view;

executing the one or more instead-of triggers in response to a modification action to the view, wherein the one or more instead-of triggers determines whether the modification action applies to a customer key range or a vendor key range;

redirecting the modification action to the customized table in response to a determination that the modification action applies to the customer key range, wherein a structured query language select function that identifies a criterion for record selection in the customer key range reads data from the customized table and writes data to the customized table;

blocking the modification action in response to a determination that the modification action applies to the vendor key range; and automatically distributing updates to tenants.

10. The computer-implemented method of claim 9, wherein a structured query language select function that identifies a criterion for record selection in the vendor key range reads data from the centralized table.

11. The computer-implemented method of claim 9, wherein executing the one or more instead-of triggers comprises inserting data in the dataset, via the view, by inserting new data to the customized table.

12. The computer-implemented method of claim 9, wherein executing the one or more instead-of triggers comprises updating data in the dataset, via the view, by replacing data in the customized table.

13. The computer-implemented method of claim 9, wherein executing the one or more instead-of triggers comprises upserting data into the dataset, via the view, by replacing data in the customized table or inserting new data to the customized table based on a set of criteria.

14. The computer-implemented method of claim 9, wherein the customer key range and the vendor key range comprise different key ranges.

15. The computer-implemented method of claim 9, wherein the key fields identify unique records in a data store.

16. The computer-implemented method of claim 9, wherein the database table comprises a relational database table.

17. A non-transitory computer readable storage medium storing instructions, which when executed by at least one data processor, result in operations comprising:

generating a customized table based on a database table, the database table comprising a dataset including a tenant identifier field, key fields, and data fields, wherein generating the customized table removes the tenant identifier field;

generating a view of the database table, wherein the view defines joins from the customized table and a centralized table, wherein the customized table comprises customer key ranges and the centralized table comprises vendor key ranges;

creating a pointer from the view to the customized table and the centralized table that causes a request to be redirected to the customized table or the centralized table;

defining one or more instead-of triggers used to modify the view upon an insert, upsert, or update operation on the view;

executing the one or more instead-of triggers in response to a modification action to the view, wherein the one or more instead-of triggers determines whether the modification action applies to a customer key range or a vendor key range;

redirecting the modification action to the customized table in response to a determination that the modification action applies to the customer key range, wherein a structured query language select function that identifies a criterion for record selection in the customer key range reads data from the customized table and writes data to the customized table;

blocking the modification action in response to a determination that the modification action applies to the vendor key range; and automatically distributing updates to tenants.

* * * * *